(12) United States Patent
Mieville et al.

(10) Patent No.: US 9,599,777 B2
(45) Date of Patent: Mar. 21, 2017

(54) CONTACT THAT IS SEALED IN THE DISCONNECTED POSITION FOR A CONNECTOR

(71) Applicant: FISCHER CONNECTORS HOLDING S.A., Saint-Prex (CH)

(72) Inventors: Jacques Mieville, Morrens (CH); Olivier Testaz, Le Mont (CH)

(73) Assignee: Fischer Connectors Holding S.A., Saint-Prex (CH)

( * ) Notice: Subject to any disclaimer, the term of this patent is extended or adjusted under 35 U.S.C. 154(b) by 0 days.

(21) Appl. No.: 14/422,994

(22) PCT Filed: Aug. 23, 2013

(86) PCT No.: PCT/IB2013/056832
§ 371 (c)(1),
(2) Date: Feb. 20, 2015

(87) PCT Pub. No.: WO2014/041450
PCT Pub. Date: Mar. 20, 2014

(65) Prior Publication Data
US 2015/0212280 A1    Jul. 30, 2015

(30) Foreign Application Priority Data
Sep. 12, 2012 (CH) ..................... 1657/12

(51) Int. Cl.
*G02B 6/38* (2006.01)

(52) U.S. Cl.
CPC ......... *G02B 6/3849* (2013.01); *G02B 6/3826* (2013.01); *G02B 6/3869* (2013.01)

(58) Field of Classification Search
CPC ................................ G02B 6/38; G02B 6/3826
See application file for complete search history.

(56) References Cited

U.S. PATENT DOCUMENTS

| 4,190,316 A | * | 2/1980 | Malsby | G02B 6/32 24/27 |
|---|---|---|---|---|
| 5,732,175 A | | 3/1998 | Fan | |

(Continued)

FOREIGN PATENT DOCUMENTS

| EP | 2 278 367 A1 | 1/2011 |
|---|---|---|
| GB | 1 450 760 | 9/1976 |

(Continued)

OTHER PUBLICATIONS

International Search Report for PCT/IB2013/056832 mailed Jan. 7, 2014, 3 pages.

(Continued)

*Primary Examiner* — Sung Pak
*Assistant Examiner* — Hoang Tran
(74) *Attorney, Agent, or Firm* — Nixon & Vanderhye P.C.

(57) ABSTRACT

The contact is sealed when disconnected and compliant when connected. It comprises at least a contact body in which the following are positioned: a transmission means held in a support at the end of which a ferrule is positioned, the seal between the ferrule and the transmission means being provided by filling with a sealant product. A sealing means is provided between the ferrule and the contact body, said means creating a seal between the ferrule and the contact body when the contact is disconnected and allowing the mechanical isolation of the ferrule relative to the contact body when the contact is connected.

17 Claims, 2 Drawing Sheets

(56) References Cited

U.S. PATENT DOCUMENTS

| | | |
|---|---|---|
| 6,357,929 B1 | 3/2002 | Roehrs et al. |
| 2001/0014197 A1 | 8/2001 | De Marchi |
| 2008/0273837 A1 | 11/2008 | Margolin et al. |
| 2012/0170893 A1* | 7/2012 | Ringgenberg ....... G02B 6/2558 385/59 |
| 2012/0257859 A1* | 10/2012 | Nhep ................... G02B 6/3887 385/81 |
| 2013/0216191 A1 | 8/2013 | Yamauchi et al. |

FOREIGN PATENT DOCUMENTS

| | | |
|---|---|---|
| GB | 1 450 760 A | 9/1976 |
| GB | 2 119 954 A | 11/1983 |
| WO | 2012/056691 A1 | 5/2012 |
| WO | WO 2012/056691 | 5/2012 |

OTHER PUBLICATIONS

Written Opinion of the International Searching Authority (non-english) for PCT/IB2013/056832, mailed Jan. 7, 2014, 5 pages.
Office Action dated Jul. 6, 2016, issued in European Patent Application No. 13 785 612.6.
Search Report dated Oct. 31, 2012, issued in Swiss Patent Application No. CH 706 931 A1.

* cited by examiner a# CONTACT THAT IS SEALED IN THE DISCONNECTED POSITION FOR A CONNECTOR This application is the U.S. national phase of International Application No. PCT/IB2013/056832, filed 23 Aug. 2013, which designated the U.S. and claims priority to CH Patent Application No. 01657/12, filed 12 Sep. 2012, the entire contents of each of which are hereby incorporated by reference.

TECHNICAL FIELD AND PRIOR ART

The present invention relates to connectors, particularly optical connectors.

More precisely, the present invention relates to optical connectors having contacts which retain sealing properties when they are disconnected, in order to prevent any materials and/or dust from damaging them.

A typical example of a contact/connector of this kind is given in U.S. Pat. No. 6,357,929.

Other examples of these contacts/connectors are marketed by the Genair and Souriau corporations, and are described in the web pages of these corporations.

Contacts that are sealed when disconnected with O-rings at the ferrules are currently to be found in the field of fiber optics connections. However, the operation of these contacts may be affected by the O-ring seal. This is because the basic principle of a fiber optic contact in the prior art is that of mechanically isolating the ferrules and the alignment sleeve from the rest of the connector.

In known connectors, the solution adopted for individual contacts is of the following type: the seal is fixed and the ferrule or part of the contact slides within this seal.

Sealing is therefore ensured, regardless of the position of the ferrule. However, the fact of having a permanent mechanical link over the whole length of the contact adversely affects its compliance in the plugged-in position (that is to say, in the connected position), and consequently also adversely affects its stability and resistance to various mechanical stresses (vibrations, etc.).

By way of example, U.S. Pat. No. 6,357,929 illustrates a connector in which sealing at the contact is maintained regardless of the position of said contact (connected or disconnected), in such a way that this mechanical link is permanent, with the aforementioned negative consequences.

BRIEF DESCRIPTION OF THE INVENTION

One object of the invention is, therefore, to improve the known contacts and connectors.

More precisely, one object of the invention is to propose a contact, for example a contact for an optical connector, having simple and effective means for ensuring that it is sealed in the disconnected position.

Another object of the present invention is to provide a sealed contact providing compliance in the plugged-in/connected position.

In particular, according to the invention, it has been discovered that a seal on the contact is not necessary, and may even be superfluous, in the plugged-in (that is to say, connected) position, because sealing is in fact provided by the casing/assembly of the connector plug in this configuration. Maintaining local sealing in the plugged-in/connected position is therefore useless, and even disadvantageous if a degree of mobility of the parts is to be allowed (to prevent external vibration effects, for example), when the connection has been made, this mobility being referred to herein as "compliance".

In other words, for an individual contact the aim is to provide sealing in the disconnected state and a degree of mobility in the connected state.

The system developed to overcome the identified problems and to achieve the objects of the invention is to make the seal and the ferrule integral with each other and to allow the seal to move with the ferrule so that the seal either does or does not have an effect, depending on the current position of the ferrule (corresponding to the connected or disconnected state).

Thus the seal becomes a moving part that no longer prevents compliance in the plugged-in/connected position.

Consequently, the individual sealing of the contact is no longer ensured in the plugged-in position, but such sealing is not in fact necessary, since it is provided at the connector. On the other hand, since the force of a spring or other equivalent means is used to compress the seal, the contact in the unplugged position becomes sealed.

Moreover, by using a means of the spring type it is possible to improve the contact of the end of the ferrule, which has a favorable effect on the connector, as will be evident from the remainder of the present description.

In one embodiment, the invention proposes the assembly of a seal (of the O-ring type, for example) onto an optical alignment ferrule, so that a seal can be created in the non-connected resting position. Said seal is linked to the ferrule and moves with the latter when said ferrule is withdrawn when the complete connector is plugged in, thus making it possible to avoid degrading the precision of the alignment of the ferrule during its insertion into the alignment sleeve, which takes place during the connection of the complete system.

The invention relates to a contact that is sealed when disconnected and compliant when connected, this contact comprising at least a contact body in which is positioned a transmission means held in a support at the end of which a ferrule is placed, a seal between the ferrule and the transmission means being provided by filling with a sealant product, wherein a sealing means is provided between the ferrule and the contact body, said means creating a seal between the ferrule and the contact body when the contact is disconnected and providing mechanical isolation of the ferrule relative to the contact body when the contact is connected.

In one embodiment, the sealing means is a seal mounted on the ferrule.

In one embodiment, the seal is an O-ring.

In one embodiment, the sealing means is a thin element added to the ferrule by overmolding.

In one embodiment, the sealing means is a thin element added to the contact body by overmolding.

In one embodiment, the contact surfaces between the ferrule and the contact body at the position of the sealing means are flat, or have complementary shapes.

In one embodiment, the contact surfaces between the ferrule, the contact body and the thin element are flat, or have complementary shapes.

In one embodiment, the transmission means is an optical fiber.

In one embodiment, the sealing means is epoxy.

In one embodiment, the invention relates to a connector comprising at least one contact as defined in the present application.

BRIEF DESCRIPTION OF THE DRAWINGS

The invention will be more readily understood from the description of embodiments and the figures relating thereto, in which.

DETAILED DESCRIPTION

Figure 1:
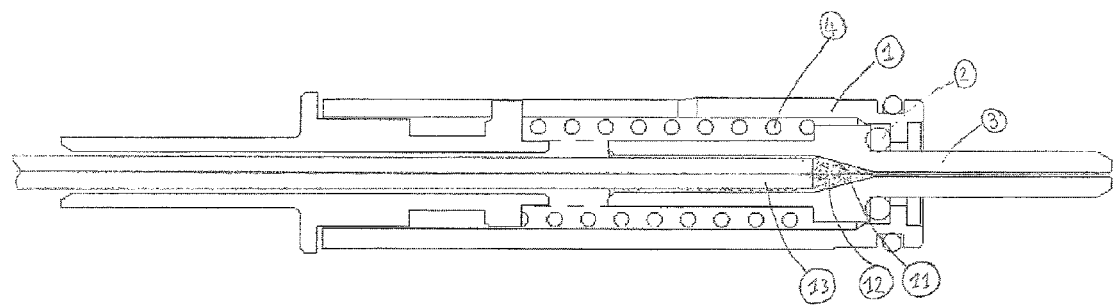
FIG. 1 shows in a sectional view an embodiment of a connector in the disconnected state.

FIG. 1: Rest position (unplugged/disconnected)

In this position, the contact is considered to be sealed according to the principles of the present invention.

More precisely, the contact comprises a contact body 1 in which is positioned an optical fiber 11 held in a buffer 13 at the end of which (on the contact side) a ferrule 3 is located. The seal between the ferrule 3 and the optical fiber 11 is provided by filling with a sealant product (epoxy, for example) 12 around the optical fiber 11 and the buffer of said fiber 13, or by other equivalent means.

A means forming a seal 2, for example an O-ring, is positioned on the ferrule 3, and enables a sealed barrier to be created between said ferrule 3 and the contact body 1. For this purpose, the seal 2 is compressed between the contact body 1 and the ferrule 3, using the compressive force produced by a spring 4.

In this "disconnected" state, the contact is therefore sealed according to the principles disclosed in the present application.

Figure 2:
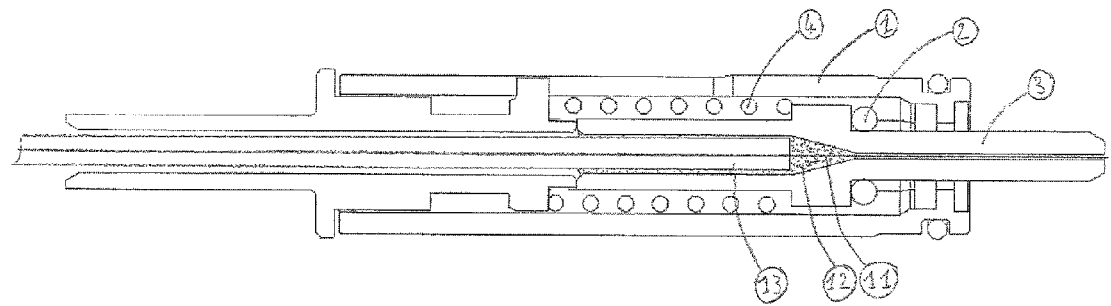
FIG. 2 shows in a sectional view an embodiment of a connector in the connected state.

FIG. 2: Position under stress (plugged in/connected)

When the contact is plugged in, the ferrule 3 is retracted relative to the contact body 1 under the action of the opposing contact (an identical ferrule, for example), consequently assuming its plugged-in position shown in FIG. 2.

In this position, the means forming a seal 2 retains its initial position on the ferrule 3 because said seal 2 lightly grips said ferrule 3. Consequently, the seal 2 never adversely affects the clearance designed around the ferrule which enables said ferrule 3 to be mechanically isolated from the contact body 1. This mechanical isolation, also known as compliance, is never impeded by said seal 2, owing to the relative movement of the seal 2.

Thus the ferrule 3 is isolated from any stress, vibration or the like which may be imparted to the connector, this isolation providing good contact in the connection, of the ferrule-to-ferrule type for example, and therefore of the optical fiber-to-optical fiber type.

Figure 3:
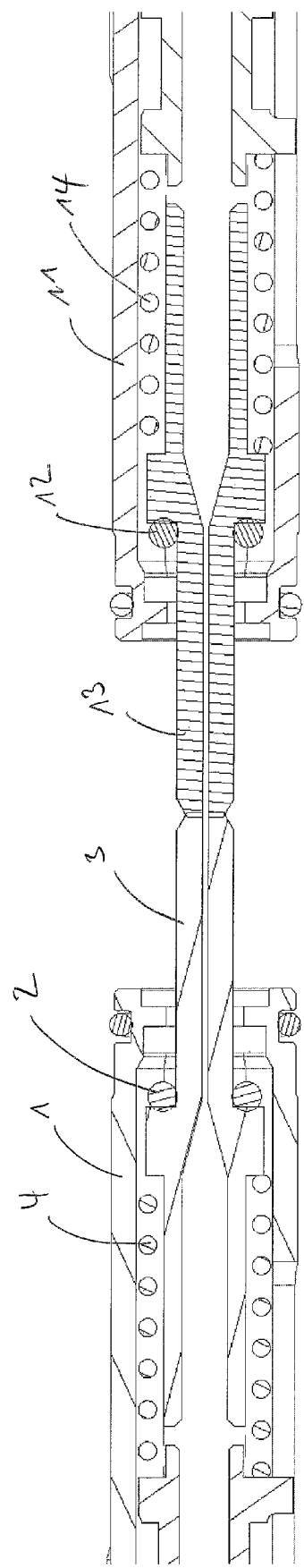
FIG. 3 shows in a sectional view an embodiment of two connectors in the state of connection to one another.

A ferrule-to-ferrule connected state is shown in FIG. 3. The contact on the left-hand side is, for example, as described with reference to FIGS. 1 and 2 above, and its (connected) state therefore corresponds to FIG. 2, where the seal 2 has been displaced with the ferrule 3. The contact shown on the right-hand side of FIG. 3 is typically identical to that of the left-hand side, in the sense that it comprises the same original means, namely, notably, a body 11, a means forming a seal 12, a ferrule 13, and a pressure means such as a spring 14. As will be readily evident from the above description, when the two contacts are connected to one another, the two ferrules 3 and 13 are applied to one another end-to-end, and as a result of this contact they push one another back, so that the seals 2, 12 are retracted equally and no longer provide sealing.

However, according to the effects produced by the present invention, the two contacts have a compliance in this state, and are mechanically isolated from the connector carrying them. Additionally, the use of a spring 4, 14 as illustrated advantageously enables the end-to-end contact of the ferrules 3, 13 to be improved, since the two springs 4, 14 exert their return force on one another. They therefore allow a degree of pressure to be exerted on the contact surfaces of the ferrules 3, 13, and even allow good contact to be maintained regardless of the external effects to which the connector is subject (movements, vibrations, etc.).

The embodiments described are illustrative examples which are not to be interpreted in a limiting manner. Variations may be devised, using equivalent means to achieve the same result.

For example, the seal 2 is shown in the form of an O-ring, but another equivalent seal is entirely feasible. For example, a seal with a rectangular cross section may be devised. It would also be feasible to use complementary shapes between the ferrule 3 and the interior of the contact body, in order to replace the seal 2 or to improve the sealing further, in place of the flat surfaces shown in FIGS. 1 and 2.

In another embodiment, the effect of the seal 2 may be achieved by covering the ferrule by overmolding a thin element, or by another covering method.

In another embodiment, the effect of the seal 2 may be achieved by covering the contact by overmolding a thin element, or by another covering method.

These two embodiments may be combined to provide a thin element overmolded onto the ferrule and onto the contact body, with flat or complementary contact surfaces.

The spring 4 may also be replaced with another equivalent means fulfilling the same function.

The contact according to the present invention is preferably an optical contact using an optical fiber. However, the principles of the present invention are applicable to other types of contact, for example electrical contacts.

The invention claimed is:

1. A contact that is sealed when disconnected and compliant when connected to another contact, comprising:
    a contact body;
    a transmission means held by a support;
    a ferrule that is placed at an end of the transmission means;
    a sealant product providing a sealing between the ferrule and the transmission means; and
    a sealing means provided between the ferrule and the contact body, the sealing means creating a seal between the ferrule and the contact body when the contact is disconnected from the another contact such that the sealing means is in contact with both an inner surface of the contact body and the ferrule, and the sealing means providing mechanical isolation of the ferrule relative to the contact body by a force exerted with the another contact such that the sealing means releases from contact with the contact body and is preventing from contacting the contact body when the contact is connected to the another contact.

2. The contact as claimed in claim 1, wherein the sealing means includes a seal mounted on the ferrule.

3. The contact as claimed in claim 2, wherein the seal is an O-ring.

4. The contact as claimed in claim 1, wherein the sealing means includes a thin element added to the ferrule by overmolding.

5. The contact as claimed in claim 1, wherein the sealing means includes a thin element added to the contact body by overmolding.

6. The contact as claimed in claim 1, wherein contact surfaces between the ferrule and the contact body at the position of the sealing means are flat, or have complementary shapes.

7. The contact as claimed in claim 4, wherein contact surfaces between the ferrule, the contact body and the thin element are flat, or have complementary shapes.

8. The contact as claimed in claim 1, wherein the transmission means includes an optical fiber.

9. The contact as claimed in claim 1, wherein the sealing product includes epoxy.

10. A connector comprising a contact as defined in claim 1.

11. A connector comprising:
a connector body;
an optical fiber held by a support located at least partially inside the connector body;
a ferrule arranged at an end of the optical fiber; and
a seal provided between the ferrule and the connector body,
wherein, the connector body, the seal and the ferrule are arranged such that in an unconnected position of the connector to another connector, the seal provides for sealing between the ferrule and the connector body by contacting both an inner surface of the connector body and the ferrule, and in a connected position to the another connector, the seal is released from contacting the connector body and is prevented from being in contact with the connector body by a fore exerted with the another connector to provide for mechanical isolation of the ferrule towards the connector body.

12. The connector according to claim 11, further comprising:
a spring located inside the connector body and in contact with the connector body and exerting pressure against the ferrule,
wherein in the unconnected position, the seal is pressed against the connector body via the ferrule by the spring.

13. The connector according to claim 12, wherein in the connected position, the ferrule is pressed against the pressure of the spring to disconnect the seal from the connector body.

14. The connector according to claim 12, wherein in the connected position, the ferrule is pressed against the pressure of the spring by the another connector to provide for mechanical isolation of the ferrule relative to the connector body.

15. The connector according to claim 12, wherein in the connected position, the ferrule is biased against a pressure of the spring by the force of the another connector to such that the ferrule is pressed to be farther inside the connector body.

16. The contact according to claim 1, further comprising:
a spring located inside the contact body and in contact with the contact body and exerting pressure against the ferrule,
wherein in the unconnected position, the sealing means is pressed against the contact body via the ferrule by the spring.

17. The contact according to claim 16, wherein in the connected position, the ferrule is biased against a pressure of the spring by the force of the another contact to such that the ferrule is pressed to be farther inside the contact body.

* * * * *